(12) United States Patent
Baldini Soares et al.

(10) Patent No.: US 10,740,860 B2
(45) Date of Patent: Aug. 11, 2020

(54) HUMANITARIAN CRISIS ANALYSIS USING SECONDARY INFORMATION GATHERED BY A FOCUSED WEB CRAWLER

(71) Applicant: International Business Machines Corporation, Armonk, NY (US)

(72) Inventors: Ioana M. Baldini Soares, Irvington, NY (US); Amit Dhurandhar, Yorktown Heights, NY (US); Abhishek Kumar, Elmsford, NY (US); Aleksandra Mojsilovic, New York, NY (US); Kien T. Pham, Brooklyn, NY (US); Kush R. Varshney, Ossining, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 15/484,325

(22) Filed: Apr. 11, 2017

(65) Prior Publication Data
US 2018/0293683 A1   Oct. 11, 2018

(51) Int. Cl.
| | |
|---|---|
| *G06N 20/00* | (2019.01) |
| *G06Q 50/26* | (2012.01) |
| *G06F 16/951* | (2019.01) |
| *G06F 16/35* | (2019.01) |
| *G06N 5/02* | (2006.01) |

(52) U.S. Cl.
CPC ........... *G06Q 50/265* (2013.01); *G06F 16/35* (2019.01); *G06F 16/951* (2019.01); *G06N 5/022* (2013.01); *G06N 20/00* (2019.01)

(58) Field of Classification Search
CPC ..................................................... G06N 20/00

USPC ...................................................... 706/15, 45
See application file for complete search history.

(56) References Cited

U.S. PATENT DOCUMENTS

| | | | |
|---|---|---|---|
| 2010/0198816 A1 | 8/2010 | Kwan | |
| 2011/0093459 A1 | 4/2011 | Dong et al. | |
| 2012/0254333 A1* | 10/2012 | Chandramouli | ........ G06F 40/40 709/206 |

(Continued)

FOREIGN PATENT DOCUMENTS

WO   2015006631 A2   1/2015

OTHER PUBLICATIONS

Andrews S. et al. "Creating corroborated crisis reports from social media data through formal concept analysis", May 6, 2016, pp. 287-312.

*Primary Examiner* — David R Vincent
(74) *Attorney, Agent, or Firm* — Scully, Scott, Murphy & Presser, P.C.; Kevin M. Jordan, Esq.

(57) ABSTRACT

A network is crawled using a trained learning model to identify a set of secondary-source documents related to an event. A hub page from the set of secondary-source documents is identified that includes a link predicted to link to a new relevant secondary-source document. The new document is added to the set of secondary-source documents. Information is extracted from the set of secondary-source documents. Feedback is received indicative of a relevancy level for the extracted information as applied to the event. Each document is classified into one or more categories related to the event, based on the extracted information and the received feedback information. A learning model is trained based on the received feedback.

20 Claims, 5 Drawing Sheets

(56) References Cited

U.S. PATENT DOCUMENTS

| | | | |
|---|---|---|---|
| 2013/0138428 A1* | 5/2013 | Chandramouli | G06F 40/253 |
| | | | 704/9 |
| 2015/0066524 A1* | 3/2015 | Fairbrothers | G16H 40/20 |
| | | | 705/2 |
| 2016/0253679 A1* | 9/2016 | Venkatraman | G06Q 30/0185 |
| | | | 705/310 |

* cited by examiner

US 10,740,860 B2

HUMANITARIAN CRISIS ANALYSIS USING SECONDARY INFORMATION GATHERED BY A FOCUSED WEB CRAWLER

FIELD

The present invention generally relates to computer analysis of a humanitarian crisis and in particular to a computer analysis of a humanitarian crisis using secondary information.

BACKGROUND

A humanitarian crisis (or humanitarian disaster) is defined as a singular event or a series of events that are threatening in terms of the health, safety or well-being of a community or a large group of people. Humanitarian crises may include armed conflicts, epidemics, famine, natural disasters, man-made emergencies, or any of various combinations thereof. These crises may involve or lead to a humanitarian disaster that extends beyond the mandate or capacity of any single agency. Regardless of the type of disaster, survivors are left in urgent of need of life-saving assistance such as shelter, food, water and health care.

One broad objective in any humanitarian response, regardless of the type of disaster, is to save lives and reduce suffering through meeting humanitarian needs. How such needs are met depends on the specific emergency. For example, in armed conflicts more effort is taken to protect the lives of humanitarian workers. In floods and tsunamis, access to affected populations might sometimes be challenging. Each humanitarian disaster raises a unique set of challenges, thereby mandating a customized response. Phenomena such as unplanned urbanization, under-development, poverty and climate change are all factors that can make humanitarian emergencies more complex, frequent and/or severe.

During many recent humanitarian crises, observers have reached for their smart phones, tablets, or other portable electronic devices to report, provide commentary, and explore information surrounding the crisis. Data gathered by these applications constitutes a large repository of real-time, crisis-related information. However, using this data to analyze a humanitarian crisis is extremely difficult, due in part to the unstructured, informal, and personalized nature of the gathered data. Thus, there exists a need to overcome at least one of the preceding deficiencies and limitations of the related art.

SUMMARY

The following summary is merely intended to be exemplary. The summary is not intended to limit the scope of the claims. A computer-implemented method embodiment of the present invention comprises crawling a network using a trained learning model to identify a set of secondary-source documents related to the event; identifying one or more hub pages from the set of secondary-source documents that include one or more links predicted to link to at least one new relevant secondary-source document; adding the at least one new relevant secondary-source document to the set of secondary-source documents; extracting information from the set of secondary-source documents; receiving feedback information indicative of a relevancy level for the extracted information as applied to the event; classifying each document in the set of secondary-source documents into one or more categories related to the event, based on the extracted information and the received feedback information; and training a learning model based on the received feedback.

Other embodiments include a computer program product and a system.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
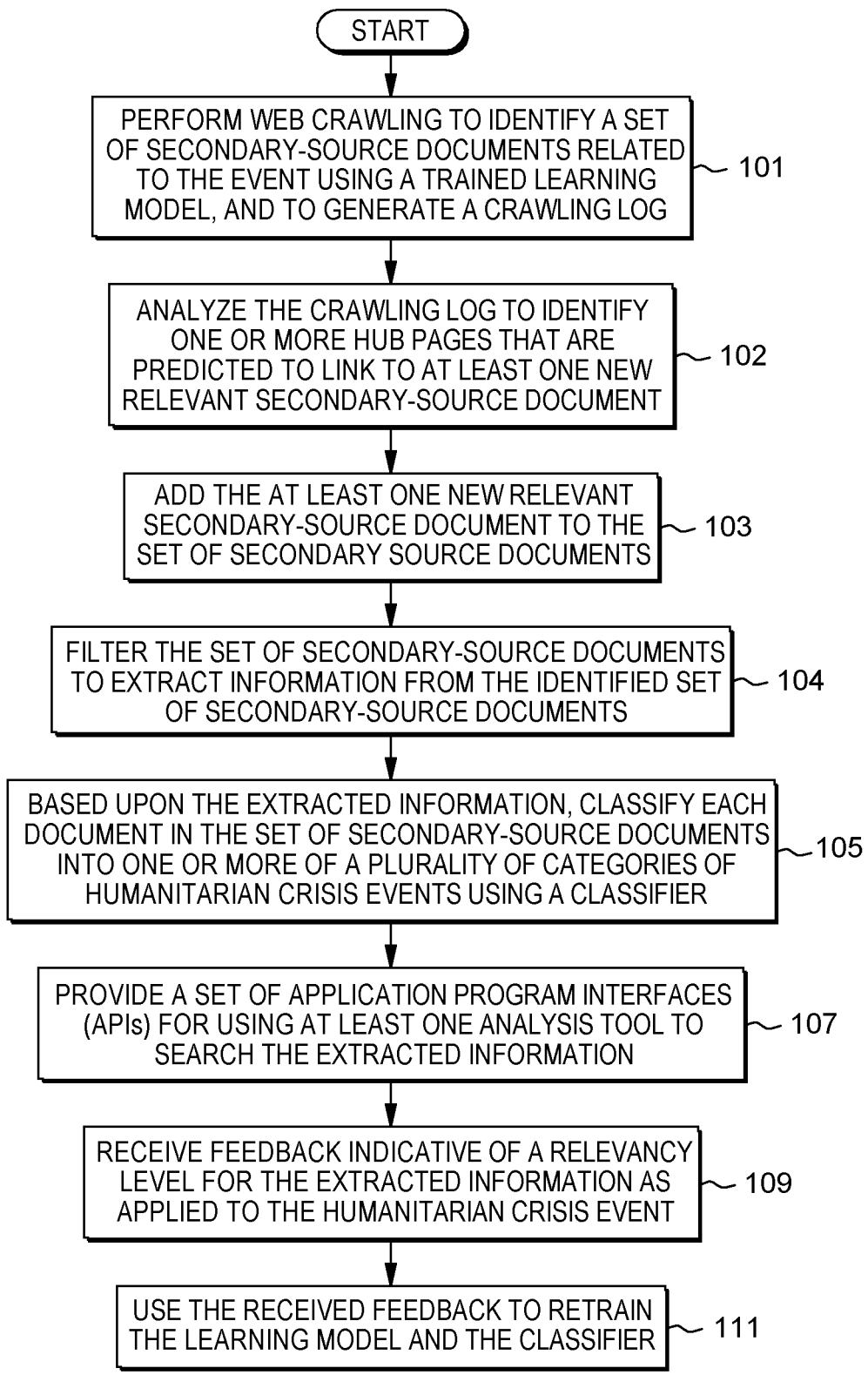
FIG. 1 illustrates an exemplary computer-implemented method in accordance with one or more embodiments of the present invention.

A secondary data review (SDR) is a rigorous process of data collation, synthesis, and analysis building on a desk study of all relevant information pertaining to a crisis. This information is available from different sources such as the government, non-governmental organizations, United Nations agencies, the Internet, media, and social media. An SDR is a meta-analysis used to inform disaster preparedness measures and support strategic and operational decision making processes. An SDR can be updated regularly as more detailed data and information becomes available, strengthening situational awareness among humanitarian actors.

When adopting the SDR approach, primary data collected during coordinated assessments in emergencies is not the main source of information. Rather, secondary information is the key information source during the initial days and weeks after a disaster. Primary data becomes more important over time as access to impacted areas and affected populations increases. Primary data is used to validate and complement the secondary data, and not the contrary.

External sourcing, different research objectives, and pre-analysis are three elements that can render data as secondary for a user. These elements may be combined or separated, but only one of these three elements will be enough to categorize a piece of information as secondary. Pre-analysis refers to reports or accounts about an event that were created by an author or a group of authors who did not experience the event first-hand, and who did not participate in the event. These reports or accounts provide an analysis of the event. Pursuant to the concept of pre-analysis, the secondary data has undergone at least one layer of analysis prior to being used for the purpose of the user's research. External sourcing means that the secondary data has been collected by another institution, person, or entity relative to the user. Differing research objectives refers to situations where the rationale or objective that led to the collection of data is different from the objectives of the user's research.

Secondary-source documents include electronically published books, scholarly articles, newspaper articles, trade journal articles, online encyclopedias, and annotated data tables. For secondary-source documents, often the best sources are those that have been published most recently. If one uses a secondary-source document that is not the most recently published document covering the event, it is helpful to know what subsequent authors have written about the event and what criticism they have made about the earlier document or its approach to the event.

One objective of the SDR is to verify information that can serve as a baseline for understanding changes resulting from a given crisis or shock, by identifying pre-existing conditions against which the impact of a disaster can be measured. Another objective is to present an initial assessment of the situation, based upon all available information, which includes an overview of the scale and impact of the crisis, the likely priority needs of the affected population, the locations of the affected population, and the short-term risks to which the affected population may be exposed. Yet another objective of the SDR is to identify gaps in knowledge which serve to further inform assessment design, including defining a depth and breadth of information that is required, formulation of appropriate research questions and instruments, and exclusion from the primary data collection process that is already available and does not require verification. In addition, yet another objective of the SDR is to support strategic planning and response prioritization for the crisis.

FIG. 1 illustrates a first exemplary computer-implemented method for analyzing a humanitarian crisis event in accordance with one or more embodiments of the present invention. The method commences at block 101 where web crawling is performed to identify a set of secondary-source documents related to the event using a trained learning model, and to generate a crawling log. The web crawling may be performed using a focused crawler to improve a harvest rate in retrieving the secondary-source documents, and for implementing the retrieving of the secondary-source documents substantially in real time. The focused crawler may be a binary crawler.

The method advances to block 102 where the crawling log is analyzed to identify one or more hub pages of the set of secondary-source documents that are predicted to link to at least one new relevant secondary-source document that is not currently in the set of secondary-source documents identified at block 101. Frequently crawling outlinks from these hub pages facilitates rapid, efficient discovery of relevant documents. At block 103, the at least one new relevant secondary-source document is added to the set of secondary-source documents. Then, at block 104, the set of secondary-source documents are filtered to extract information from the documents. The extracted information may include, for example, a country, state, county, city, or geographic location in which the humanitarian crisis event took place or is taking place, a publication date for the extracted information, and textual content from the documents.

The program progresses to block 105 where each document in the set of secondary-source documents is classified into one or more of a plurality of categories of humanitarian crisis events based upon the extracted information. This classification may be performed using a classifier that is integrated into the focused crawler. For purposes of illustration, humanitarian crises can be grouped into one or more of the following categories:

Natural disasters: These disasters involve geophysical events, hydrological events, climatological events, meteorological events, biological events, or any of various combinations thereof. Geophysical events may comprise earthquakes, tsunamis, mudslides, and volcanic eruptions. Hydrological events may include floods and avalanches. Climatological events may include droughts. Meteorological events may encompass storms, tornadoes, and cyclones. Biological events may comprise epidemics, plagues, and communicable diseases.

Man-made emergencies, such as armed conflicts, plane and train crashes, fires and industrial accidents.

Complex emergencies, which involve a combination of natural and man-made elements. Multiple causes of vulnerability and a combination of factors lead to the humanitarian crisis. Examples include food insecurity, armed conflicts, and displaced populations. Complex emergencies are typically characterized by extensive violence and loss of life, displacements of human populations, widespread damage to societies and economies, and the need for large-scale, multi-faceted humanitarian assistance. In some situations, humanitarian assistance may be hindered by political and military constraints. Humanitarian relief workers may face significant security risks in some areas.

The operational sequence progresses from block 105 to block 107 where a set of application program interfaces (APIs) are provided for using at least one analysis tool to search the extracted information. The set of APIs may be configured for implementing a plurality of different information analysis tools simultaneously or contemporaneously in a seamless manner. Additionally or alternatively, the set of APIs may be configured for performing visual analytics, faceted searches, full-text searches, or any of various combinations thereof.

Optionally, the set of APIs may be used to replace the classifier. Such an approach allows a user to provide their own classification algorithms with their own labels, focusing on specific areas of interest for that user. This approach may be realized by running the classifier using a classification algorithm that is a well-defined service with a well-defined RESTful API. To be able to use a different classification algorithm, a user can simply register a different RESTful endpoint that implements the well-defined RESTful API of the classifier.

The RESTful API—also referred to as a RESTful web service—is based on representational state transfer (REST) technology, an architectural style and approach to communications often used in web services development. The RESTful endpoint is any endpoint device that is configured for implementing the RESTful API. The RESTful API is an application program interface (API) that uses hypertext transfer protocol (HTTP) requests to obtain, post, and delete data. In many situations, REST technology is preferable to Simple Object Access Protocol (SOAP) technology because REST leverages less bandwidth, making it more suitable for internet usage. In the context of an internet website, an API may be provided in the form of code that allows two software programs to communicate with each another.

Next, at block 109, feedback is received indicative of a relevancy level for the extracted information as applied to the humanitarian crisis event. For example, one or more domain experts may provide feedback to the trained learning model in the form of a set of relevancy scores. Generally, if one trains the classifier with feedback using positive labels, one needs to allow a user to select a label from a set of predefined labels provided by a user interface. This requirement makes the training process more complicated than using a tiered rating score. Thus, to implement the rating score using the interface, a machine learning technique called negative labeling may be employed provide feedback for training the classifier.

Negative labeling is performed using a tiered rating system. For illustrative purposes, the feedback may be provided using a three-tiered rating score where a first tier is indicative of a document that is not relevant to a humanitarian crisis. A second tier is indicative of a document that is relevant to a humanitarian crisis, but deals with a wrong crisis type. For example, it may be desired to identify documents related to a first type of humanitarian crisis comprising tornadoes, but a particular document deals with a second type of humanitarian crisis comprising tsunamis. Such a document would be rated as belonging to the second tier. A third tier is indicative of a relevant document that is related to the correct type of humanitarian crisis. This three-tiered rating score may be utilized in conjunction with a relatively simple user interface and may be employed to improve both the crawler and the classifier. The rating score need not include exactly three tiers, as a fewer number of tiers or a greater number of tiers may be employed. Then at block 111, the feedback is used to retrain the learning model and the classifier.

Although the foregoing example illustrates a procedure for analyzing a humanitarian crisis, the method of FIG. 1 may be adopted for use with any of a variety of alternative scenarios. These alternative scenarios may involve any application or setting that requires substantially real-time retrieving of information from the Internet. Some illustrative examples of these applications and settings include collecting and classifying financial news and reports, collecting and classifying adult advertisements from online classified ads and escort sites to combat sex trafficking, performing public policy searches, performing intelligence investigations, implementing business strategies, searching for marketing information, and policing potentially illegal activities that are conducted on the Internet.

For example, the method of FIG. 1 may be used to provide a service that performs focused web searches on a totally new topic (such as war conflicts). Pursuant to such an approach, the crawler is a programmable focused search engine that can be programmed by a user to performed focused searches on a particular topic by providing a set of initial seeds for the crawler and the classifier through a well-defined restful endpoint device.

The procedure of FIG. 1 provides several beneficial technical effects. For example, the time necessary to manually collect and annotate relevant documents for humanitarian crisis analysis has been dramatically reduced by identifying the secondary-source documents in block 101, and using these documents to automatically collect and annotate further relevant documents. As used herein, an annotation is a note, comment, or concise statement concerning one or more key ideas in the document Likewise, computing resource consumption for crawling irrelevant documents is reduced while enhancing real-time crawling capacity. The simplified three-tiered feedback mechanism engages users to improve the trained learning model and the classifier.

Figure 2:
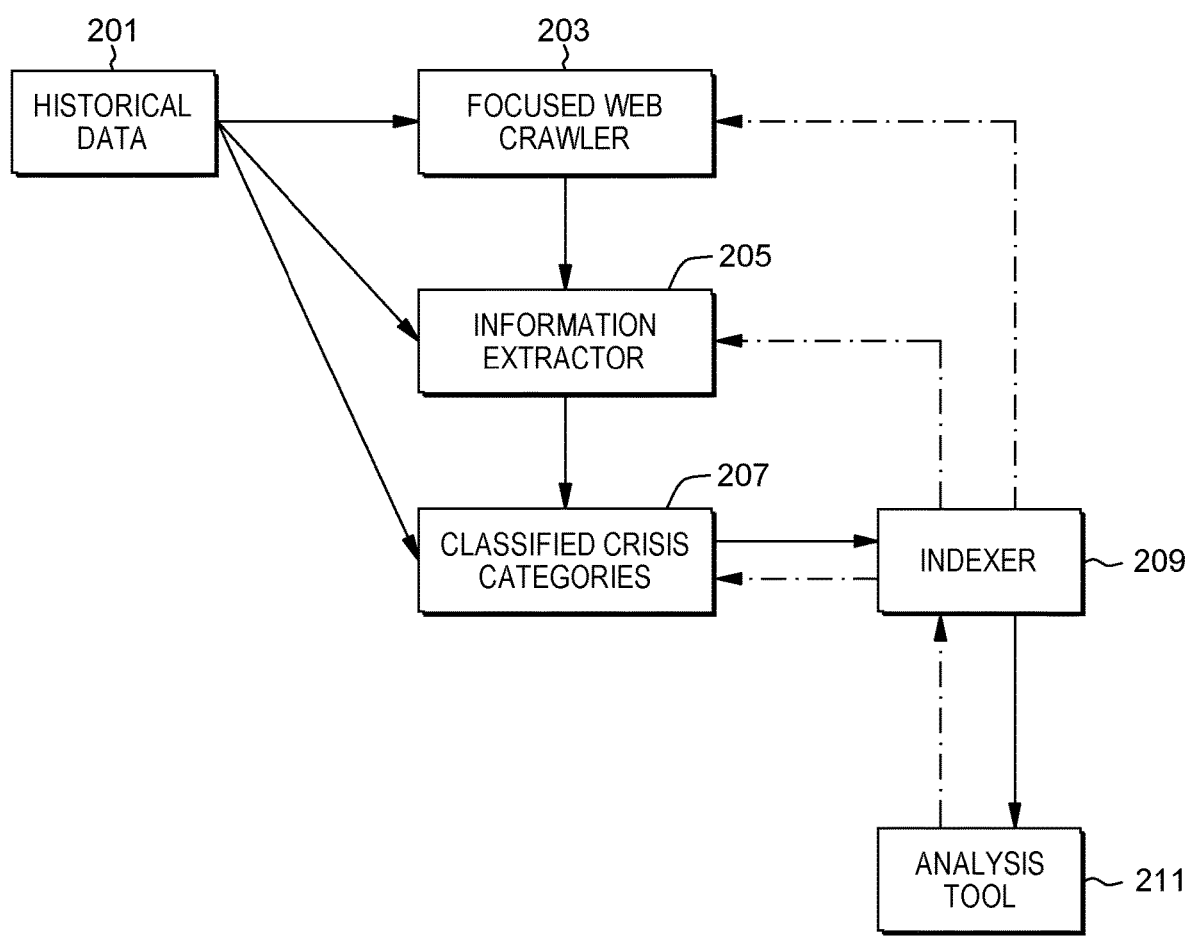
FIG. 2 illustrates an exemplary block diagram of a system using the method of FIG. 1.

FIG. 2 illustrates an exemplary system for analyzing a humanitarian crisis using the method of FIG. 1. Historical data 201 includes electronically stored information that is accessible over the Internet. For example, this information may include a plurality of newspaper and magazine articles, journal articles, scientific publications, and other types of documents. A focused web crawler 203 includes a binary classifier and a set of crawling policies for performing focused searches of the historical data 201 on a particular topic. This topic may be predetermined or specified by a user. The focused web crawler 203 may also be called a Web spider, an ant, an automatic indexer, or a Web scutter.

The focused web crawler 203 accepts one or more initial seed uniform resource locators (URLs). These seed URLs represent a list of URLs to be visited by the focused web crawler 203. As the focused web crawler 203 visits web pages corresponding to these URLs, it identifies all hyperlinks that are included in these visited web pages and adds these hyperlinks to the list of URLs to visit. These added hyperlinks are referred to as a crawl frontier. URLs from the frontier are recursively visited according to a set of crawling policies. When the focused web crawler 203 is performing archiving of websites, the crawler copies and saves the information as it goes. The archives may be stored in such a way they can be viewed, read, searched, and navigated as they were on the live web, but are preserved as 'snapshots'.

The behavior of the focused web crawler 203 is governed by a combination of one or more crawling policies. These policies include any of a selection policy which is indicative of web pages that should be downloaded, a revisit policy which states when to check for changes to web pages, a politeness policy that states how to avoid overloading web sites, and a parallelization policy that states how to coordinate a set of distributed focused web crawlers.

The large volume of documents that may be included in the historical data 201 implies that the focused web crawler 203 can only download a limited number of web pages within a given time, so the crawling policies may be used to prioritize downloads. In some cases, the high rate of change of web pages in the historical data 201 can imply that one or more web pages might have already been updated or even deleted.

An information extractor 205, operatively coupled to the web crawler 203, extracts information from the historical data 201 using the seed URLs, the set of crawling policies, and the binary classifier. The extracted information may comprise textual information, a publication date, a geographic location, a country name, a county, a state, a city, or any of various combinations thereof. The extracted information is organized into one or more of a plurality of classified crisis categories 207 using an indexer 209. An analysis tool 211, operatively coupled to the indexer 209, sends feedback data to the indexer 209. The indexer 209 sends data to the analysis tool 211 in response to one or more RESTful APIs that are executed by the analysis tool 211. As indicated previously, the RESTful API is based on representational state transfer (REST) technology, an architectural style and approach to communications often used in web services development.

The focused web crawler 203 may be configured to crawl a relevant document as soon as the document is published. Recrawling from scratch consumes a lot of time, potentially days or weeks depending upon the size of the historical data 201 and any politeness policy that may be implemented. At the same time, recrawling while discarding previously visited URLs would be inefficient for discovering new URLs. Existing solutions for recrawling the web do not include the concept of relevance.

Assume that one desires the focused web crawler 203 to recrawl after a time $\Delta t$. This is equivalent to having a crawling budget of K because crawling speed is bounded by the politeness policy. This recrawling problem can be represented mathematically using the directed graph 300 model illustrated in FIG. 3. The directed graph G 300 comprises a plurality of vertices V and a plurality of edges E, where G=(V, E). The vertices V include a set of hub nodes $V_h$ 301, 303, 305, 307, and 309 interconnected with a set of relevant nodes $V_r$ 311, 313, 315, 317, 319 and 321 along one or more edges e 321, 322, 323, 324, 325, 326, 327, 328, and 329 of the plurality of edges E. Thus, $V=V_h \cup V_r$. Likewise, $V_r=\{v_r\}$: relevant nodes, and $V_h=\{v_h\}$: hub nodes. Each edge $e \in E$ represents a link from $v_h$ to $v_r$. Let $N_{v_h}=\{v_r\}$: neighbor des of $v_h$. Let $t_{v_r}$=publication date of $v_r$, and let $\Delta t_{v_r}$=[current date]$-t_{v_r}$. Then a score $(v_r)$ for each of the relevant nodes $V_r$ 311, 313, 315, 317, 319 and 321 may be determined as:

Score($v_r$)=max(1, 7–$\Delta t_{v_r}$), where $t$ is specified in units of days.

A hub node $V_h$ 301, 303, 305, 307, or 309 that links to a more recent relevant node $V_r$ 311, 313, 315, 317, 319 or 321 is considered to be more important than a hub node $V_h$ that links to a less recent relevant node $V_r$. The relative recentness of a hub node $V_h$ 301, 303, 305, 307, or 309, or a relevant node $V_r$ 311, 313, 315, 317, 319 or 321, may be determined with reference to a position of the hub node $V_h$ or the relevant node $V_r$ along a time 340 axis of the directed graph G 300. The score of K hub nodes is the sum of the scores of the union of all their children.

A time-sensitive K-budget cover (TKC) problem for the directed graph G 300 is formulated. When a cover C=0, the TKC problem reduces to a K-budget cover problem which is known to be non-deterministic polynomial-time hard (NP-hard). NP-hardness, in computational complexity theory, is a class of problems that are at least as hard as the hardest problems in NP. More precisely, a problem H is NP-hard when every problem L in NP can be reduced in polynomial time to H, that is: assuming a solution for H takes 1 unit time, we can use H's solution to solve L in polynomial time. As a consequence, finding a polynomial algorithm to solve any NP-hard problem would give polynomial algorithms for all the problems in NP, which is unlikely as many of them are considered hard.

The K-budget cover problem may be stated as follows: Given a budget of K, one wants to select K hub nodes that maximize X as follows:

$$X = \sum_{v \in U} \text{Score}(v)$$

where U is the Union of all child nodes of K selected hub nodes. It is noted that multiple hub nodes can share the same child nodes however all nodes in U are unique.

Figure 4:
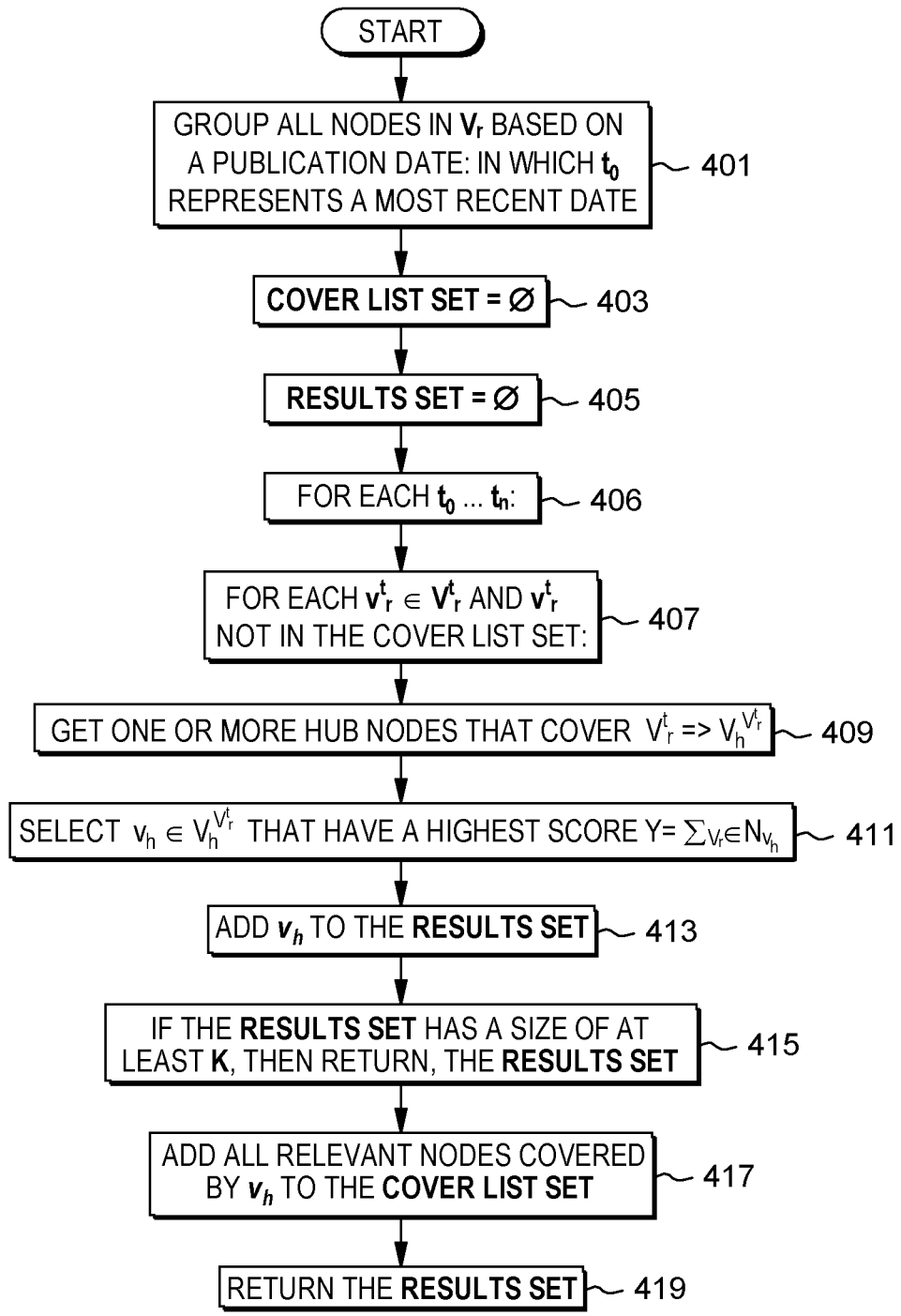
FIG. 4 illustrates another exemplary computer-implemented method in accordance with one or more embodiments of the present invention.

A greedy algorithm may be used to solve the K-budget cover problem as shown in FIG. 4. Essentially, the greedy algorithm is an algorithmic paradigm that follows a problem solving heuristic of making a locally optimal choice at each of a plurality of stages, with the hope or objective of finding a global optimum. The procedure of FIG. 4 commences at block 401 where all relevant nodes $V_r$ are grouped based upon a publication date, in which $t_0$ represents a most recent date: $V_r=(V_r^{t_0}, \ldots, V_r^{t_n})$. At block 403, a cover list set is set to equal the empty set $\emptyset$, and at block 405, a results set is set to equal the empty set $\emptyset$.

Next, at block 406, for each of a plurality of publication dates $t_0 \ldots t_n$, the steps of blocks 407 through 417 are performed. At block 407, for each $v_r^t \in V_r^t$ and $v_r^t$ not in the cover list set, blocks 409 through 417 are performed. At block 409, one or more hub nodes $V_h$ are obtained that cover $v_r^t \Rightarrow V_h^{r,t}$. Then, at block 411, a hub node $v_h \in V_h^{r,t}$ is selected that has a highest score $$Y = \sum_{v_r \in N_{v_h}} \text{Score}(v_r).$$

This hub node $v_h$ is added to the results set at block 413. If the results set has a size of at least K, then the results set is returned at block 415. Next, at block 417, all relevant nodes $v_r$ covered by $v_h$ are added to the cover list set at block 417. The results set is returned at block 419.

Figure 3:
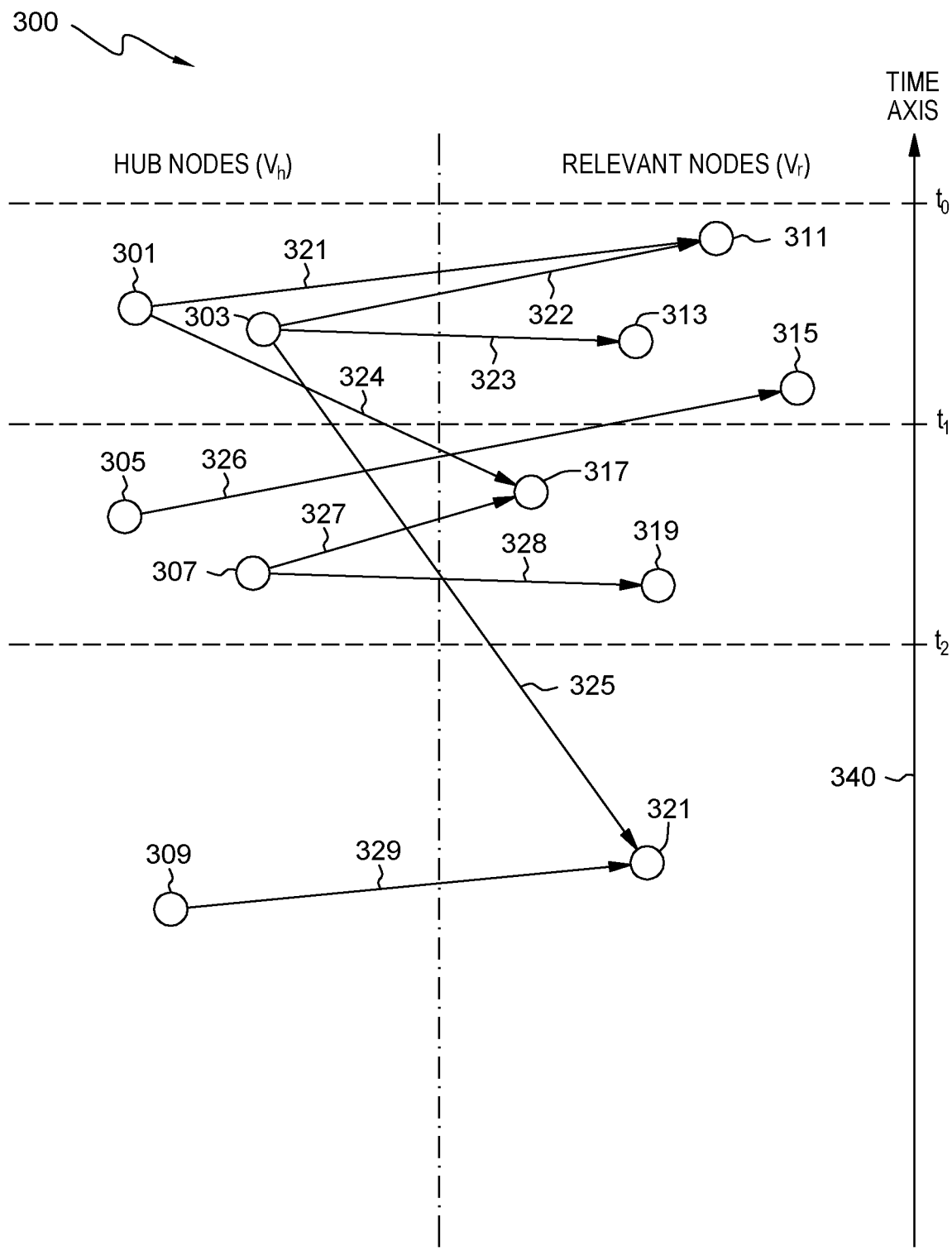
FIG. 3 illustrates exemplary nodes of a computer-implemented model in accordance with one or more embodiments of the invention.
Figure 5:
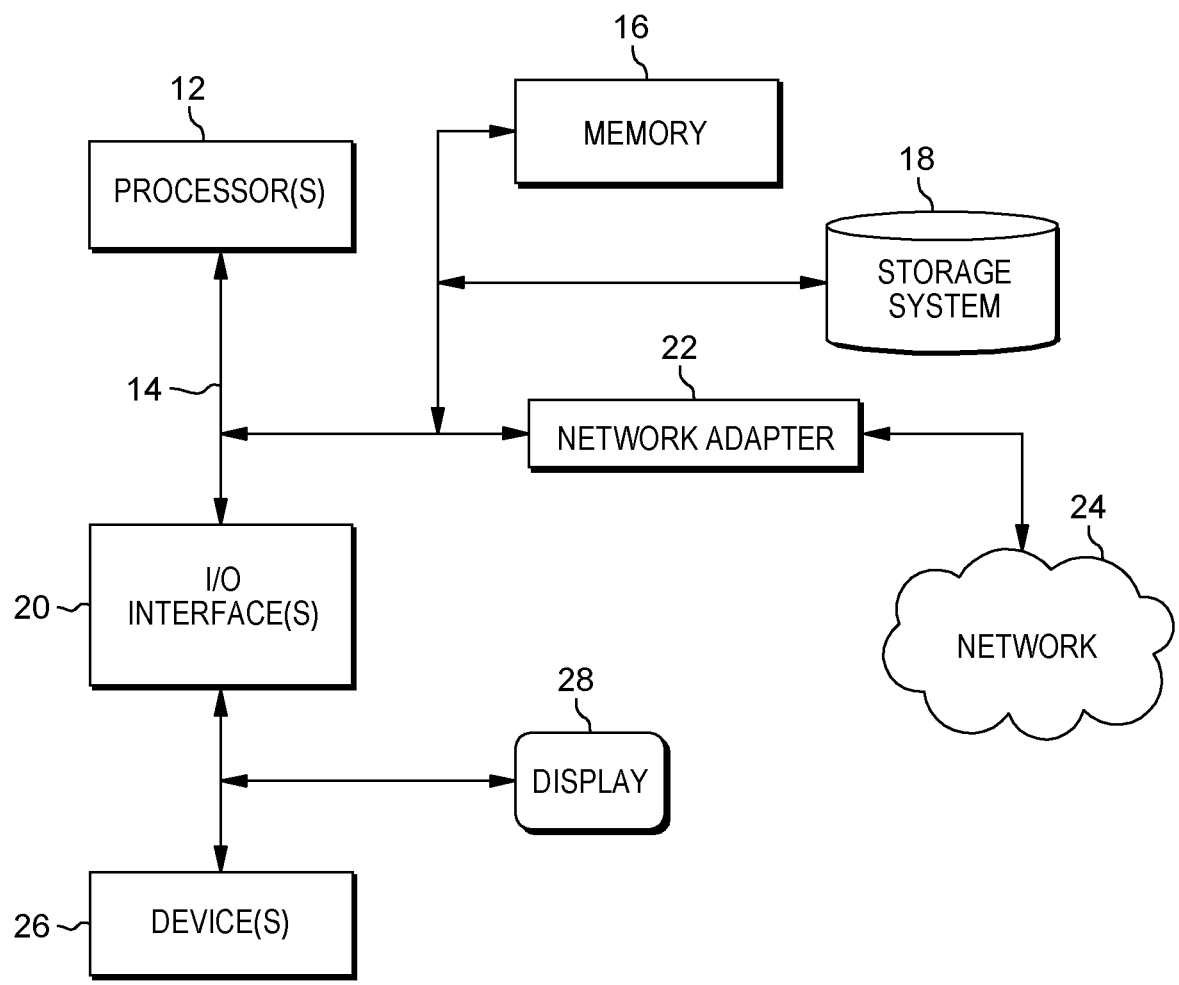
FIG. 5 illustrates an exemplary system in accordance with one or more embodiments of the present invention.

FIG. 5 illustrates an exemplary system on which any of the methods of FIG. 1 or 3 may be performed in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module that performs the methods described herein. The module may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for analyzing an event, the method comprising:
   crawling a network using a trained learning model to identify a set of secondary-source documents related to the event;
   identifying one or more hub pages from the set of secondary-source documents that include one or more links predicted to link to at least one new relevant secondary-source document;
   adding the at least one new relevant secondary-source document to the set of secondary-source documents;
   extracting information from the set of secondary-source documents;
   receiving feedback information indicative of a relevancy level for the extracted information as applied to the event;
   classifying each document in the set of secondary-source documents into one or more categories related to the event, based on the extracted information and the received feedback information;
   and
   training a learning model based on the received feedback.

2. The computer-implemented method of claim 1 wherein the crawling of the network comprises web crawling, and the method further comprises generating a crawling log in response to the web crawling.

3. The computer-implemented method of claim 1 wherein the event comprises a humanitarian crisis.

4. The computer-implemented method of claim 1 wherein the set of secondary-source documents comprise one or more of an electronically published book, a scholarly article, a newspaper article, a trade journal article, or an online encyclopedia.

5. The computer-implemented method of claim 1 further comprising providing a set of application program interfaces for using at least one analysis tool to search the extracted information.

6. The computer-implemented method of claim 1 further comprising representing each of a respective plurality of hub pages using a corresponding hub node of a directed graph, and representing each of a respective plurality of relevant documents of the set of secondary-source documents using a corresponding relevant node of the directed graph.

7. The computer-implemented method of claim 1 wherein said classifying is performed using a classifier that is retrained using the received feedback.

8. A computer program product for analyzing an event, the computer program product comprising a computer-readable storage medium having a computer-readable program stored therein, wherein the computer-readable program, when executed on a computing device including at least one processor, causes the at least one processor to perform:
   crawling a network using a trained learning model to identify a set of secondary-source documents related to the event;
   identifying one or more hub pages from the set of secondary-source documents that include one or more links predicted to link to at least one new relevant secondary-source document;
   adding the at least one new relevant secondary-source document to the set of secondary-source documents;
   extracting information from the set of secondary-source documents;
   receiving feedback information indicative of a relevancy level for the extracted information as applied to the event;
   classifying each document in the set of secondary-source documents into one or more categories related to the event, based on the extracted information and the received feedback information;
   and
   training a learning model based on the received feedback.

9. The computer program product of claim 8 wherein the crawling of the network comprises web crawling, and the processor is further configured to perform generating a crawling log in response to the web crawling.

10. The computer program product of claim 8 wherein the event comprises a humanitarian crisis.

11. The computer program product of claim 8 wherein the set of secondary-source documents comprise one or more of an electronically published book, a scholarly article, a newspaper article, a trade journal article, or an online encyclopedia.

12. The computer program product of claim 8 further configured for providing a set of application program interfaces for using at least one analysis tool to search the extracted information.

13. The computer program product of claim 8 further configured for representing each of a respective plurality of hub pages using a corresponding hub node of a directed graph, and for representing each of a respective plurality of relevant documents of the set of secondary-source documents using a corresponding relevant node of the directed graph.

14. The computer program product of claim 8 further configured for performing said classifying using a classifier that is retrained using the received feedback.

15. A system for analyzing an event, the system comprising:
    at least one processor; and
    a memory operably coupled to the at least one processor, wherein the memory comprises program instructions which, when executed by the at least one processor, cause:
    crawling a network using a trained learning model to identify a set of secondary-source documents related to the event;
    identifying one or more hub pages from the set of secondary-source documents that include one or more links predicted to link to at least one new relevant secondary-source document;
    adding the at least one new relevant secondary-source document to the set of secondary-source documents;
    extracting information from the set of secondary-source documents;
    receiving feedback information indicative of a relevancy level for the extracted information as applied to the event;
    classifying each document in the set of secondary-source documents into one or more categories related to the event, based on the extracted information and the received feedback information;
    and
    training a learning model based on the received feedback.

16. The system of claim 15 wherein the crawling of the network comprises web crawling, and the system is further configured to perform generating a crawling log in response to the web crawling.

17. The system of claim 15 wherein the event comprises a humanitarian crisis.

18. The system of claim 15 wherein the set of secondary-source documents comprise one or more of an electronically published book, a scholarly article, a newspaper article, a trade journal article, or an online encyclopedia.

19. The system of claim 15 further configured for providing a set of application program interfaces for using at least one analysis tool to search the extracted information.

20. The system of claim 15 further configured for representing each of a respective plurality of hub pages using a corresponding hub node of a directed graph, and for representing each of a respective plurality of relevant documents of the set of secondary-source documents using a corresponding relevant node of the directed graph.

\* \* \* \* \*